(12) United States Patent
Harrop

(10) Patent No.: US 11,600,248 B2
(45) Date of Patent: Mar. 7, 2023

(54) BOW FOR STRINGED MUSICAL INSTRUMENT

(71) Applicant: Project Zed Limited, Auckland (NZ)

(72) Inventor: Joseph Stanley Harrop, Auckland (NZ)

(73) Assignee: Project Zed Limited, Grafton (NZ)

( * ) Notice: Subject to any disclaimer, the term of this patent is extended or adjusted under 35 U.S.C. 154(b) by 123 days.

(21) Appl. No.: 17/334,549

(22) Filed: May 28, 2021

(65) Prior Publication Data
US 2021/0375240 A1 Dec. 2, 2021

(30) Foreign Application Priority Data
Jun. 2, 2020 (NZ) ........................................ 764986

(51) Int. Cl.
*G10D 3/16* (2020.01)
*G10D 3/22* (2020.01)
*G06F 3/044* (2006.01)

(52) U.S. Cl.
CPC ............... *G10D 3/16* (2013.01); *G06F 3/044* (2013.01); *G10D 3/22* (2020.02)

(58) Field of Classification Search
None
See application file for complete search history.

(56) References Cited

U.S. PATENT DOCUMENTS

| | | | |
|---|---|---|---|
| 4,187,573 A | 2/1980 | Fyfe et al. | |
| 5,509,238 A | 4/1996 | Scalfati | |
| 6,324,795 B1 | 12/2001 | Stiles et al. | |
| 7,249,442 B2 | 7/2007 | Pellegrino et al. | |
| 7,263,806 B2 | 9/2007 | Pellegrino et al. | |
| 9,812,029 B1* | 11/2017 | Henry | G10G 7/00 |
| 11,002,032 B2 | 5/2021 | Campillay et al. | |
| 2009/0308232 A1* | 12/2009 | McMillen | G10D 3/16 84/723 |
| 2010/0251637 A1 | 10/2010 | Nishimoto et al. | |
| 2016/0115703 A1 | 4/2016 | Katayama et al. | |
| 2020/0318373 A1 | 10/2020 | Campillay et al. | |

* cited by examiner

*Primary Examiner* — Stephen T. Reed
(74) *Attorney, Agent, or Firm* — Avyno Law P.C.

(57) ABSTRACT

A bow for a musical instrument is provided where the bow includes a bowstick having a proximal end configured to be grasped by a user and a distal end remote from the proximal end, the distal end being provided with a stylus configured for use with a capacitive touch screen. The stylus may include a touch screen contact portion for contacting a touch screen and a bow attachment portion for attachment to a bow of a musical instrument. The stylus allows a musician using the bow to interact with a touchscreen device without having to release the bow.

18 Claims, 6 Drawing Sheets

The Bow

Bowstylus Bow

Bowhead For Modification

Bowstylus Assembly

Conductor Nib Base + Sleeve

Expandable Blister With Gauze

Conductor Nib Assembly

Carbonclip Nib Sleeve
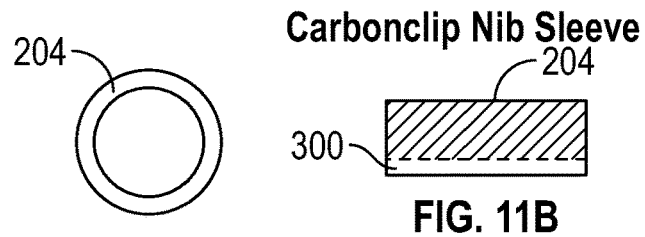
FIG. 11A
FIG. 11B
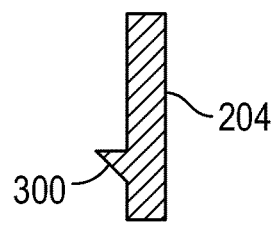
FIG. 11C
Modified Bowhead For Carbonclip Nib
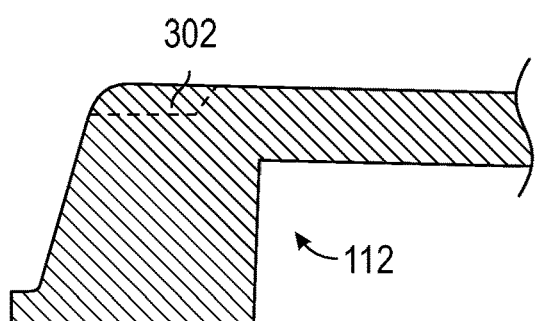
FIG. 11D
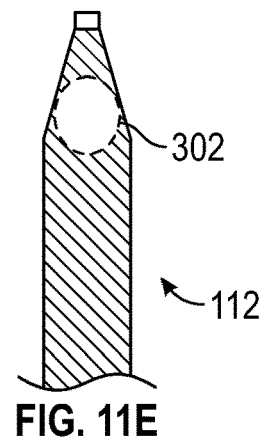
FIG. 11E
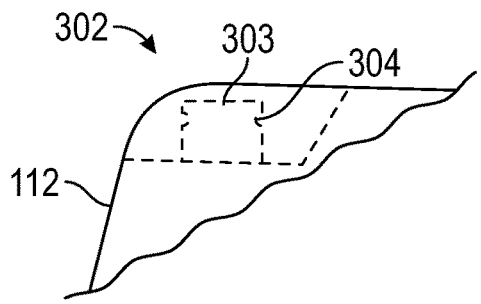
FIG. 11F
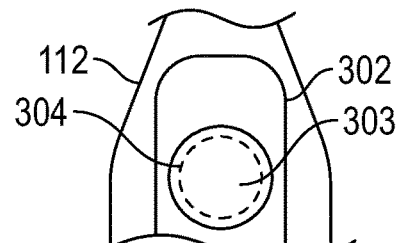
FIG. 11G

BOW FOR STRINGED MUSICAL INSTRUMENT

FIELD OF THE INVENTION

This disclosure relates to bows for stringed musical instruments, and has relevance to use of bows with touchscreen devices generally. The disclosed subject matter has particular relevance to use of bows with capacitive touchscreen devices.

BACKGROUND

The design, functionality, and use of bows for stringed instruments have essentially remained the same since Francois Tourte's modifications in the second half of the 18th century.

The bow is a thin length of suitable material, typically wood, carbon fibre, or fibreglass, between 35 cm and 80 cm long (depending on the size and type of string instrument it is used for), with a ribbon of horse tail hair stretched between each end.

With the bow held in the right (or rarely, left) hand, the ribbon of hair is run perpendicularly along the string, with friction causing the string to vibrate and emit sound. Any variation in speed, pressure and/or contact point of this friction will cause a corresponding variation in sound production, therefore all elements of bow design and production must be considered in order to create a quality product.

With a few exceptions (e.g. Chinese erhu) the bow is a separate item to the instrument with which it is used.

With the advent of affordable touchscreen devices (which may be capacitive touchscreen devices or otherwise and are referred to herein generally as touchscreen devices), musicians have been using these devices to download and display musical scores. Such devices are also convenient and popular as learning tools. For example, the musician can play a video which demonstrates playing technique which the musician may then practice as the video is being played. Touchscreen devices also have the advantages of no need for lights; easy access to music scores; recording of video and audio, and sharing media.

Stringed instruments that are played using a bow require that the user must either put the bow down in order to use the touchscreen (for example to turn a page, mark a score, or pause a video) or the user must assume a position relative to the screen by which the user can extend a finger from the bow hand for example to manipulate the touch screen. Both of these alternatives are problematic, or at least inconvenient, for the musician. Similarly, interacting with a touchscreen by hand can be cumbersome, and potentially unhygienic (e.g. bacteria build up on the surface).

It is an object of the present disclosure to provide a bow, or a bow accessory, for a stringed musical instrument that will overcome or at least ameliorate one of more of the problems currently experienced by musicians making use of touchscreen devices while playing their instrument.

SUMMARY

In one aspect the present disclosure addresses the problems mentioned above by providing a bow having a stylus means such as a stylus member or nib member located at a distal end of the bow.

The term "stylus" as used in this document includes a projecting feature or element such as a nib or projection that is adapted or configured for use with a touchscreen.

In one aspect a bow for a musical instrument is provided, the bow comprising a bow stick having a proximal end configured to be grasped by a user and a distal end remote from the proximal end, the distal end being provided with a stylus means configured for use with a capacitive touch screen.

In one embodiment the stylus means or nib is provided at the bowhead.

In one embodiment the stylus means or nib is provided on or near the front ridge or peak of the bow.

In one embodiment the stylus means or nib is provided at the peak.

In one embodiment the stylus means or nib is provided at the stick of the bow near or adjacent to the peak.

In one embodiment the stylus means or nib is configured to be detectable by a resistive touchscreen.

In one embodiment the stylus means or nib is configured to be detectable by an infrared or surface acoustic wave touchscreen.

In one embodiment the stylus means or nib is configured to be detectable by a capacitive touchscreen.

In one embodiment the stylus means or nib is active or charged whereby the stylus means or nib provides a current or field which may be detected by a touchscreen.

In one embodiment the stylus means or nib is conductive whereby a capacitive touchscreen detects the location of the stylus on the touchscreen when the stylus contacts the touchscreen.

In one embodiment there is a conductive path between the stylus and the bow stick.

In one embodiment there is a conductive path between the stylus and the end of the bow normally held by the user. In one embodiment the conductive path may be provided by a member or material other than the bow stick.

In one embodiment the stylus is removable.

In one embodiment the stylus is retrofittable.

In one embodiment the stylus means or nib comprises a resilient material. The material may comprise a plastic, or polymer or rubber.

In one embodiment the stylus means or nib is received in a formation provided on the bowhead. The stylus means or nib may be removably received, In one embodiment the stylus means or nib includes an attachment means to attach the stylus means or nib to the bowhead. In one embodiment the bowhead comprises a stylus or nib attachment means to attach the stylus means or nib to the bowhead. In one embodiment the bow attachment means and the stylus or nib attachment means are complementary.

In one embodiment the engagement means comprises a complementary protrusion and recess.

In another aspect the present disclosure provides a touchscreen stylus comprising a body of resilient material provided with an outer conductive matrix.

In one embodiment the stylus comprises a conductive base electrically connected to the conductive matrix.

In one embodiment the conductive matrix comprises a conductive mesh.

In another aspect the present disclosure addresses the problems mentioned above by providing a bow for a stringed musical instrument that includes an electrically conductive path from a proximal end of the bow, which is in use held in the hand of a user, to a distal end of the bow, whereby a touchscreen may detect a touch from the distal end of the bow.

In one embodiment the conductive path comprises the bowstick.

In one embodiment the conductive path comprises a conductor provided in or on the bowstick.

In another aspect the disclosed subject matter provides a stylus means or nib means comprising a touch screen contact portion configured to contact a touch screen and a bow attachment portion configured for attachment to a bow of a musical instrument.

The subject matter of the present disclosure thus has the advantage that a user of the bow may use it in the same way as a finger in order to interact with the touchscreen device. Thus, the user can use the touchscreen device without the need to put the bow or instrument down or even change their 'bow hold'. This approach is cheaper and easier to use than current 'hands-free' touchscreen interactive technology.

Numerous other objects, features, and advantages of the present invention will be readily apparent to those skilled in the art upon a reading of the following disclosure when taken in conjunction with the accompanying drawings.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

As used herein the term "and/or" means "and" or "or", both. As used herein "(s)" following a noun means the plural and/or singular forms of the noun. The term "comprising" as used in this specification means "consisting at least in part of". When interpreting statements in this specification which include that term, the features prefaced by that term in each statement all need to be present, but the other features can also be present. Related terms such as "comprise" and "comprised" are to be interpreted in the same matter. The entire disclosures of all applications, patents and publications, cited above and below, if any, are hereby incorporated by reference.

DRAWING DESCRIPTION

One or more embodiments or examples of the invention will now be described with reference to the accompanying drawings, in which.

Figure 7:
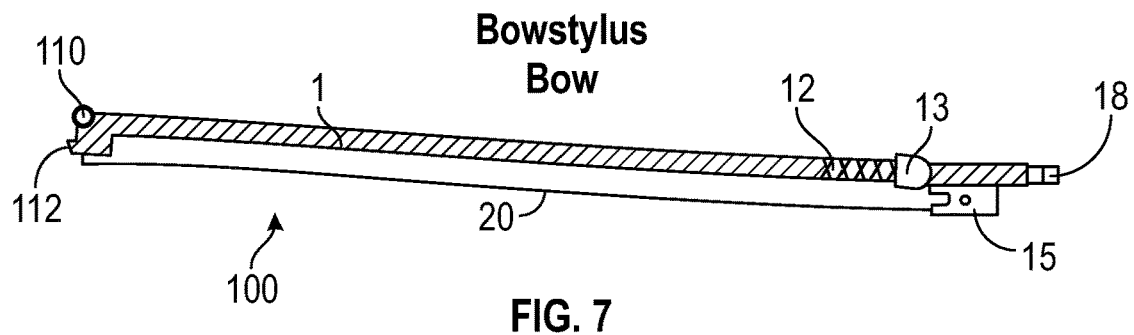
FIG. 7 is an elevation of a new bow.
Figure 8:
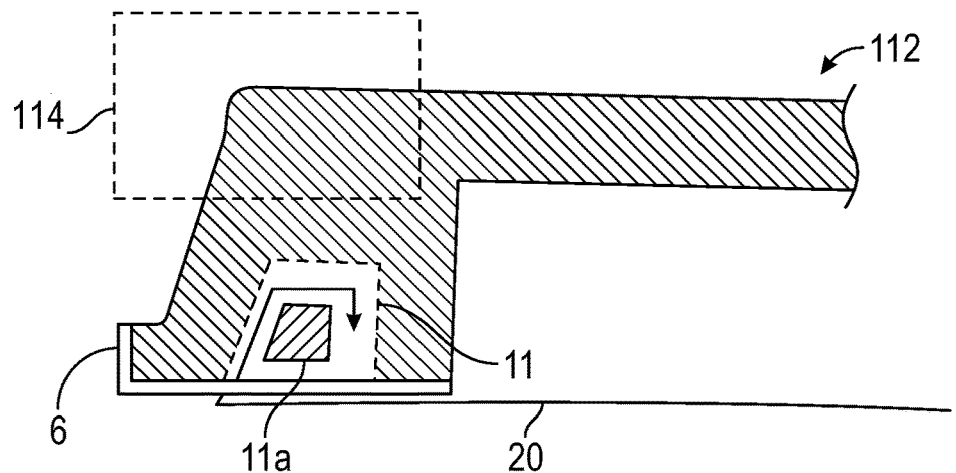
FIGS. 8 and 9 are partial elevations of the bow of FIG. 7, showing the bowhead.
Figure 9:
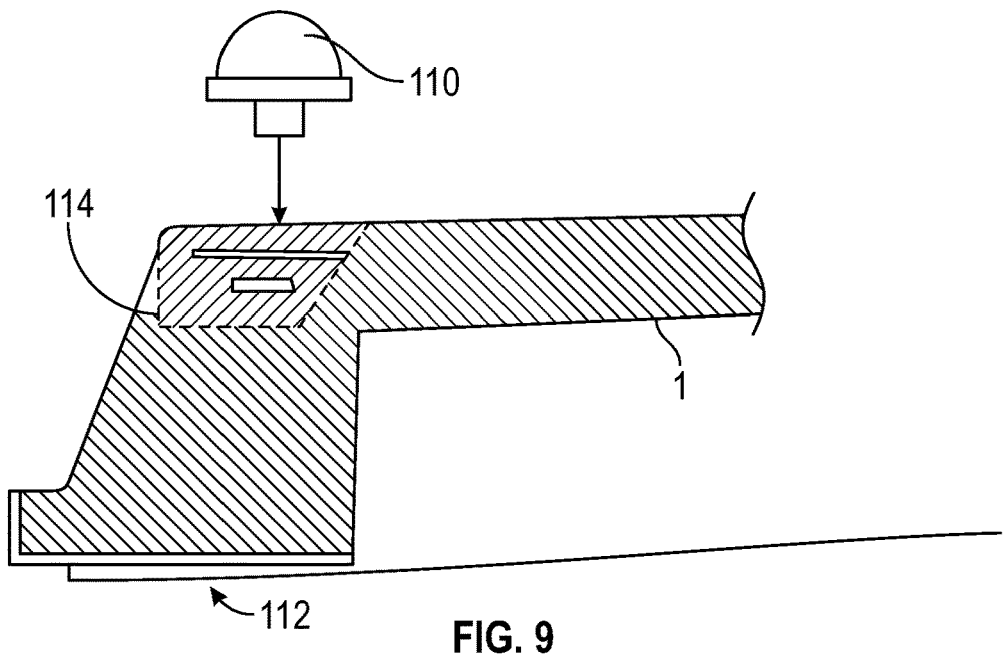

FIGS. 10*a*-10*f* show components of a nib or stylus which may be used according to an embodiment such as the bow of FIGS. 7-9;

FIGS. 11*a*-11*g* show a first embodiment of apparatus for selective engagement of a nib with a bow head, with FIGS. 11*f* and 11*g* showing more detail of FIGS. 11*d* and 11*e* respectively;

FIGS. 12*a*-12*d* show a first embodiment of apparatus for selective engagement of a nib with a bow head.

DETAILED DESCRIPTION

It will be apparent from the following description that the invention is applicable to traditional wooden and more modern bows and has applicability to a wide variety of bowed string instruments, including without limitation: violin, viola, cello, double bass, Chinese Erhu, Nickelharpa, Cretan lyra, and Indian Sarangi, to name a few.

For the purposes of ease of description, examples or embodiments discussed herein are primarily focused on a violin bow, but those skilled in the art to which the invention relates will appreciate that the invention is equally applicable to any other type of bow for any other stringed musical instrument. Similarly, the terminology used herein which may be most appropriately used in connection with a violin bow should be understood by the reader as being substituted, as appropriate, with terminology that is specific to a bow used with another musical instrument.

Before describing one or more embodiments or examples, we will refer to FIGS. 1-6, which show aspects of a violin bow. The features identified using reference numerals in FIGS. 1-6 are as follows:

1 Stick
2 Peak
3 Front Ridge
4 Nose
5 Tip
6 Ebony Liner
7 Tip Plate
8 Cheek
9 Chamfer
10 Front Edge of Head Mortise
11 Head Mortise
12 Lapping
13 Thumb Piece
14 Thumb Seat
15 Frog
16 Parisian Eye
17 Back Surface of Frog
18 Button or End Screw
19 Throat
20 Bow Hair
21 Ferrule
21*a* Lower Front Edge of Ferrule
22 Rails
23 Heel Plate
24 Pin
25 Slide
26 Underslide
27 Tongue
28 Hair Channel
29 Lower Edge of Frog
30 Frog Mortise
31 Eyelet
32 Curved Portion of the Ferrule
33 Flat Portion of the Ferrule
34 Opening for the Hair Referring now to FIG. 7, a bow 100 according to one embodiment is disclosed. Features of bow 100 which are the same or similar to the construction of the known bow of FIGS. 1-6 have the same reference numerals. The bow 100 is a functioning string instrument bow—it performs all the functions necessary to create sound on a string instrument.

One distinguishing feature of bow 100 is nib or stylus means 110, which is configured to activate or operate a touchscreen i.e. a touchscreen or touchscreen device is responsive when the screen is contacted by, or sufficiently near to, the nib or stylus 110. Thus the bow 100 allows a user to interact or operate a touchscreen device while still holding the bow 100, and while still holding the instrument with which the bow is associated.

The stylus means or nib is provided at the bowhead in this example. This alters the geometry of the bow in such a way that the bow may be used by the musician as a pointing device in conjunction with a touchscreen. Thus the bow 100 has become a multifunctional component.

The stylus means or nib is preferably provided on or near the front ridge or peak of the bow. It may also be provided at the peak, or be provided at the stick of the bow near or adjacent to the peak. These positions allow the musician to hold the bow in the bowing hand in a correct position orientation to play the instrument, while having the stylus or projection or nib positioned for ready contact with the touchscreen.

The stylus means or nib is configured to be detectable by a resistive touchscreen. It may also or alternatively be configured to be detectable by an infrared or surface acoustic wave touchscreen. It may also or alternatively be configured to be detectable by a capacitive touchscreen.

In one embodiment the stylus means or nib is active or charged whereby the stylus means or nib provides a current or field which may be detected by a touchscreen.

As described further below, in one embodiment the stylus means or nib member is conductive whereby a capacitive touchscreen detects the location of the stylus on the touchscreen when the stylus contacts the touchscreen.

Figure 1:
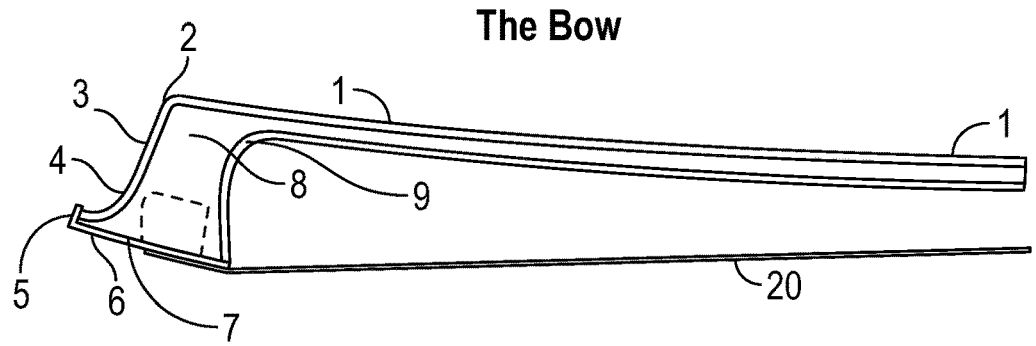
FIG. 1 is a side elevation of the distal end of a known stringed instrument bow such as a violin.
Figure 2:
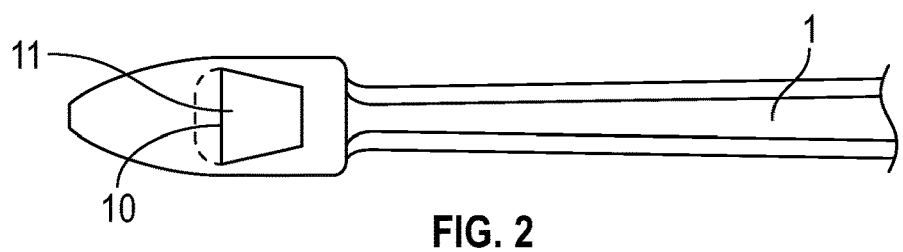
FIG. 2 is a plan view of the bow of FIG. 1.
Figure 3:
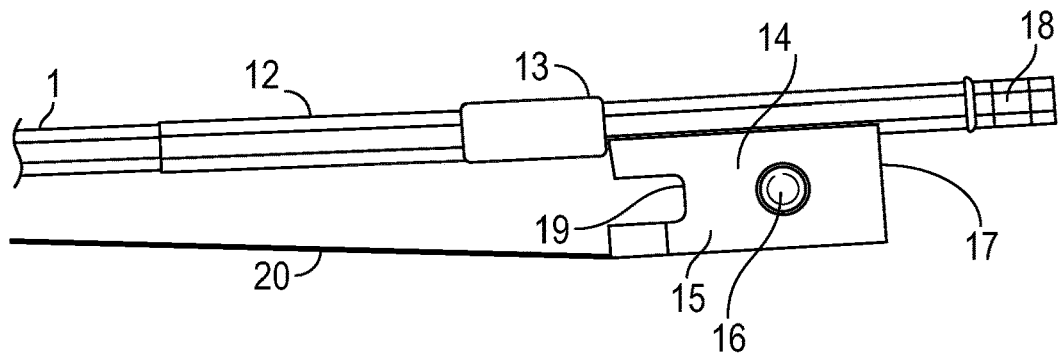
FIG. 3 is a side elevation of the proximal end of a known stringed instrument bow, being the end held in the hand of a user when playing a musical instrument.
Figure 4:
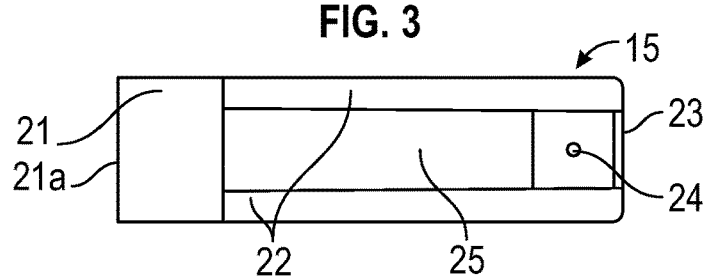
FIG. 4 is a plan view from below of the frog (being a part of the end construction shown in FIG. 3)
Figure 5:
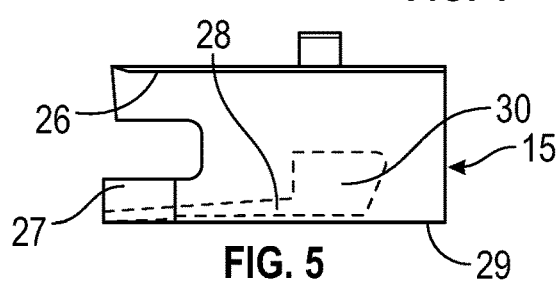
FIG. 5 is a side elevation of the apparatus of FIG. 4.
Figure 6:
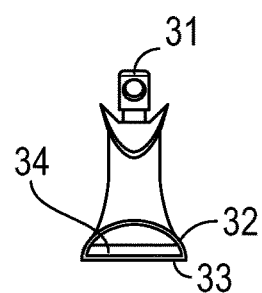
FIG. 6 is an end elevation of the of the apparatus of FIG. 4.

Still referring to FIG. 7, the bowhead 112 in this example has been modified relative to traditional or known bowheads such as that shown in FIG. 1. Modification in the embodiment shown in FIG. 7 may be made for the purpose of attaching the nib or stylus 110, and/or to compensate for the change in weight, balance or "feel" of the bow as experienced by a user due to the presence of the nib or stylus 110. Modification as such of a bowhead is not necessary in some embodiments. For example the bow 100 may be manufactured with the stylus 110 as an integral part of the bow, and the mass of the stylus 110 may be accounted for in the overall bow design.

In some embodiments the bow 100 is made of carbon fibre, with a conductive nib 110 dependent form or extending from the bowhead to enable the user to operate their capacitive touchscreen device with the tip their bow. Therefore, the bow 100 can be used in the same manner as a common stylus pen when interacting with touchscreen devices. A bowhead of an orthodox carbon fibre construction has sufficient spare mass which can be removed to allow the addition of a nib or stylus 110 at or near to the bow peak 2, front ridge 3, nose 4 or tip 5.

If a user prefers to not use a bow made of a conductive material such as carbon fibre, then a conductive path through the bowstick can be formed using a conductor such as applying conductive tape or wire, or otherwise including a conductor in the bow structure, for example embedding a conductor in the bow during manufacture.

As will be apparent from the following description, the stylus or nib 110 may be retrofitted to an existing bow to create bow 100.

Another distinguishing feature of bow 100 which might be either incorporated in the bow at manufacture or a modification if the stylus or nib 110 is retrofitted to an existing bow, is a change in mass of the button or end screw 18. This may be configured, for example by a design that adds or reduces mass or changes mass or the centre of mass position to compensate for any change of weight or balance in the stick 1 or the overall bow 100 due to the presence of the stylus or nib 110 on the bowhead.

As referred to above, in different embodiments the stylus or nib 110 may be configured for use with different forms of touch screen. In the example of capacitive touchscreens, the stylus or nib 110 may be made active, so that it may be energised if required, for example using an electric circuit powered by a battery. In these examples or embodiments, further functionality can be incorporated in the apparatus, for example authentication or additional detection. In other embodiments or examples operation of the stylus or nib 110 may be dependent on the conductivity of the nib or stylus itself. In yet other embodiments the bow stick 1 may formed of a material that is sufficiently conductive to enable a conductive path between the ends of the bow 100 such that in use there is a conductive path between the stylus or nib 110 and the hand of a user. To this end, the lapping 12 used for bow 100 may be formed from a conductive material, for example wire, and the thumb leather may also be replaced with a more electrically conductive material to facilitate the formation of a conductive path between the frog 15 and the stick 1. We have found that carbon fibre has sufficient conductivity to provide a suitable conductive path between the proximal and distal ends of a bow.

Referring now to FIG. 8, the bowhead 112 of the bow 100 is shown in greater detail. The area in broken lines shows a portion of the bowhead that may be removed or altered (for example if the bow head is being designed for manufacture), or simply used to receive a nib 110, or possibly modified for retrofitting nib 110. Although in this example the portion being modified is near the retrofitted to an area near the front ridge 3 or peak 2 of the bowhead, those skilled in the art will understand that other regions may be modified in order to achieve the required outcome.

The head mortise 11 includes a wedge 11a for receiving and securing the bowhair 20. Lining 6 is also provided over the tip plate. It will be seen that the lining 6 may be formed from a conductive material to assist with nib placement in a region closer to the tip 5 if that were to be desirable in some embodiments.

Turning to FIG. 9, another more detailed view of bowhead 112 is shown, this time illustrating an embodiment of the nib 110 which is received in or near the peak 2, and in some embodiments received in a modified region 114 of the bowhead. The nib 110 construction and engagement with the bow 100 will be described further below.

Assembly of the bow 100 assembly is as follows: (i) fasten the nib 110 to the bowhead; (2) fit all other bow components and fit bowhair in the normal manner.

Referring now to FIGS. 10a-10e, the construction of one embodiment of nib 110 is shown in more detail. Although these figures do not show the nib 110 as assembled, they do show the individual components and the way in which those components are assembled to form the nib.

The central element of this embodiment of nib 110 is a body 206 of resilient conductive material. The material may comprise a conductive polymer, such as a conductive rubber for example. In one embodiment the body 206 is provided as a tip and is configured and/or comprised of a selected material such as conductive rubber so that that will collapse or deform and spread when depressed at or near its apex. In at least one embodiments the apex of the tip expands to a minimum diameter such as a minimum diameter of 3 mm.

This facilitates detection by a capacitive touchscreen device when the tip contacts the touch screen.

In some embodiments body 206, which may conveniently be referred to as a tip or a blister 206, may be capable of being itself affixed to the bowhead to provide a nib having the required functionality.

In the embodiment illustrated in FIGS. 10a-10e, the blister 206 is covered or combined with a conductive matrix or mesh 208. This may comprise a metallic gauze 208, and is capable of deforming with the blister 206 in use so that it conforms to the blister shape. The blister 206 and the gauze 208 together function in a way so as to allow for interaction with capacitive touch screen devices without using a finger, and in a manner that will not damage the surface of the device screen. The blister 206 cushions any heavy impacts on a device touchscreen.

A base 200 is provided to support blister 206 and which includes a fastening means 202, which may comprise a shank or projection or screw in some embodiments. In some embodiments the base 200 may be configured to affix directly to the bowhead. In other embodiments the fastening means 202 facilitates or enables connection between the nib and the bowhead. In some embodiments the base 200 and/or shank 202 are constructed form conductive material such as metal. In some embodiments the base 200 and/or shank 202 are configured for releasable engagement with the bowhead.

Figure 10A:
Figure 10B:
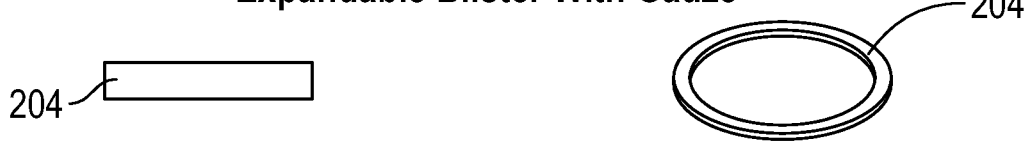
Figure 10C:
Figure 10D:
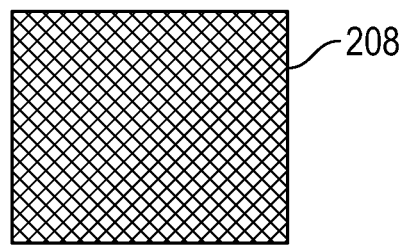
Figure 10E:
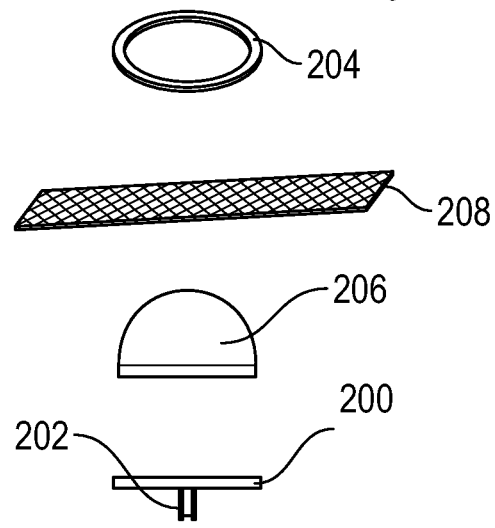

In order to mechanically secure the gauze 208 about the blister 206 and secure these components to the base, a sleeve 204 can be used to affix the gauze 208 to the base. Thus, as shown in FIG. 10e, the blister 206 is placed on base 200, then the gauze 208 is placed over the blister, and then sleeve 204 is slid over the gauze and about a peripheral region of the base to thereby frictionally engage or trap the gauze between an inner surface of the sleeve and an outer periphery of the base 200.

In one embodiment the nib 110 components are as follows:
  i. A thin, lightweight metal base plate 200 with a short screw or unthreaded shank 202.
  ii. A soft blister 206 made of conductive rubber that will collapse and spread when depressed to a minimum diameter of 3 mm.
  iii. iii. A lightweight conductive metal gauze 208 that covers, and expands with, the blister 206.
  iv. iv. A thin metal sleeve 204 of a size and shape to slide over the blister and fix the edges of the gauze to the metal base 200.

In one embodiment the base 200 may be a small, flat metal plate, in a size and shape appropriate to different types and sizes of bow. The short metal screw or shank 200 extending from the Nib base 200 is made of electronically conductive metal. The expandable rubber blister is of a size appropriate to the different types and sizes of bow, with sufficient camber and/or swell to allow the blister to expand when depressed to create a contact surface (with the touch screen) of at least 3 mm in diameter. In an embodiment the thin, woven conductive metal gauze 208 covers the blister 206 substantially entirely and seamlessly, with the gauze edges glued to the underside of the base or gathered under the blister, with both blister 206 and gauze 208 glued to the base.

In some embodiments one or more of the base 200, fastening means 202 and sleeve 204 may be made from non-metallic conductors, such as carbon fibre for example.

In one embodiment the nib 110 is assembled as follows:
  i. Wrap the correct sized piece of metal gauze 208 around the blister 206, gathering the edges of the gauze under the blister.
  ii. ii. If necessary. glue the underside of the blister and the edges of the gauze to the upper side of the metal base 200.
  iii. iii. Slide the metal sleeve 204 over both blister and gauze, fixing the edges of the gauze and blister to the metal base.
  iv. iv. the nib assembly 110 is now ready to be fitted onto a bow head, such as a modified bow head 112.

In some embodiments a nib such as nib 110 may be provided as a substantially integral part of bow 100. For example, the base 200 may form part of the bowhead, and the blister and gauze can be added as part of the manufacturing process.

Figure 10F:
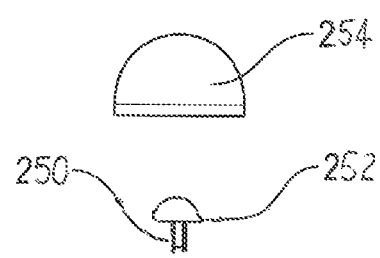

In one embodiment, illustrated in FIG. 10F, the nib 110 comprises a screw or shank 250 having an upper edge or surface 252 on which a tip or blister 254 is provided. In this embodiment no conductive covering mesh is required. Instead, the screw or shank provides a connector between the bow and the tip. The connection may be purely electric or physical. or both. In one example the connector is a metallic screw, the threaded portion of which is driven into the bowhead. The screw head provides a connection region for engagement with the tip. For example, the tip may have a recess which receives the screw head to provide an engagement. Rather than a screw, the connector may comprise a shank that is provided with the bow head during manufacture for example. In this embodiment the tip may be physically and electrically connected to the shank, or physically supported by the bow with the shank providing an electrical connection.

A physical connection between the bow and the tip or blister 254 can be made by adhering the tip to the bow, or by contouring the bowhead for engagement with the tip. Thus, in one example, the bowhead may have a projection which is received within a recess of the tip.

In other embodiments, the nib 110 is removably attachable to the bowhead. This has the benefit that various sizes or shapes or types of nibs can be provided depending upon the bow size or design or dependent on user preference, or possibly even on touchscreen type.

In providing a removably attachable embodiment it is possible to omit one or more features of the nib construction described above. For example, the shank 202 may be omitted. Although the embodiments shown and described immediately below do not refer to a base 200, a base 200 may be provided as part of the nib, or may be formed as a part of the bowhead.

Referring now to FIGS. 11a-11e and 12a-12d, two embodiments will be described in which a nib 110 may be removably affixed to a bowhead 112. In these embodiments the nib 110 can be fastened onto i.e. engaged with a modified bowhead (preferably but not necessarily by way of a carbon fibre sleeve) in at least two ways:
  i. using bow engagement means comprising a barbed lip on the inside of the sleeve that clips onto a corresponding nib engagement means comprising a recess provided in a depression on the bow head (FIGS. 11a-11e);
  ii. using bow engagement means comprising barbed arms which clip into corresponding nib engagement means comprising depressions or recesses in the bowhead (FIGS. 12a-12d).

It will be apparent to a person skilled in the art that the barbs or ridges and corresponding complementary recesses may be provided on one or the other of the sleeve 204 or bowhead 112.

Figure 12A:
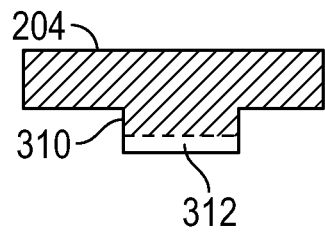
Figure 12B:
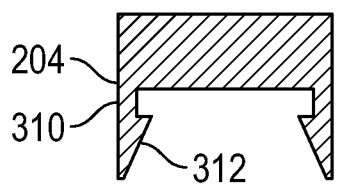

Turning to FIGS. 11a-11c sleeve 204 has a ridged lip on an inner surface. The sleeve 104 may be made from carbon fibre (or other conductive material). In the embodiment of FIGS. 12a and 12b the sleeve 104 has arms 310, and each arm has a projection, ridge or barb 312—being of a size and shape to fit over the wrapped blister.

Referring to FIGS. 11d to 11g, the bowhead 110 has a recess 302 in which a formation 303 has a curved, or semi-circular or circular depression 304 in an outer surface thereof which includes a formation to engage with the ridge 300. Formation 303 may in some embodiments stand proud of the bowhead.

Figure 12C:
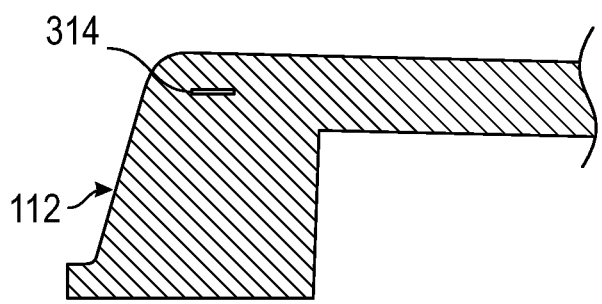
Figure 12D:
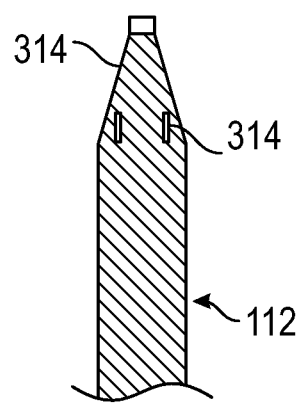

Referring to FIGS. 12c and 12d, the bowhead 110 has two depressions, which may be straight or linear depressions 314 to engage with ridges 314

Thus the bowhead 112 may be specifically designed bowhead with appropriate depressions to accommodate the fastening sleeve's inner ridged lip or barbed arms. Thus, a variety of different bowheads and nibs (or sleeves) can be provided, allowing a user to select a nib for a bow of their personal preference from both a musical performance perspective, and from the perspective of the touchscreen device they wish to use.

While the apparatus and methods of this invention have been described in terms of the embodiments included herein, it will be apparent to those of ordinary skill in the art that variations may be applied to features or integers the apparatus and/or methods described herein without departing from the concept, spirit, and scope of the invention. All such similar substitutes and modifications apparent to those skilled in the art are deemed to be within the spirit, scope, and concept of the invention as defined by the appended claims.

I claim:

1. A bow for a musical instrument, the bow comprising:
   a bowstick having a proximal end configured to be grasped by a user and a distal end remote from the proximal end,
   the distal end being provided with a stylus configured for use with a capacitive touch screen.

2. The bow as claimed in claim 1, wherein the stylus is configured to be detected by the touch screen when the stylus is in contact with or immediately adjacent to the touch screen.

3. The bow as claimed in claim 1, wherein the stylus comprises a stylus member or a nib.

4. The bow as claimed in claim 1, wherein the stylus is provided at a bowhead of the bow.

5. The bow as claimed in claim 1, wherein the stylus is provided on or near the front ridge or peak of the bow.

6. The bow as claimed in claim 1, wherein the stylus is provided at the peak.

7. The bow as claimed in claim 1, wherein the stylus is provided at the stick of the bow near or adjacent to the peak.

8. The bow as claimed in claim 1, wherein the stylus is configured to be detectable by one or more of a capacitive, resistive, infrared, or surface acoustic wave touchscreen.

9. The bow as claimed in claim 1, wherein the stylus is conductive whereby a capacitive touchscreen detects the location of the stylus on the touchscreen when the stylus contacts the touchscreen, or the stylus is active or charged whereby the stylus means or nib provides a current or field which may be detected by a touchscreen.

10. The bow as claimed in claim 1, wherein there is a conductive path between the stylus and the bow stick and/or between the stylus means and the proximal end of the bow.

11. The bow as claimed in claim 1, wherein the stylus is removable or retrofittable.

12. The bow as claimed in claim 1, wherein the stylus comprises a resilient material, and/or may comprise a plastic, or polymer or rubber.

13. The bow as claimed in claim 1, wherein the stylus is received in a formation provided on the bowhead or is removably received in the formation.

14. The bow as claimed in claim 1, wherein the stylus comprises and a conductive polymer tip provided on the bowhead.

15. The bow as claimed in claim 14, wherein the bowhead is contoured to provide a connection feature to engage with the polymer tip.

16. The bow as claimed in claim 15, further comprising a connector element configured to provide a connection between the bow and the polymer tip.

17. The bow as claimed in claim 16, wherein the connector element is conductive.

18. A stylus means or nib means comprising:
    a touch screen contact portion configured to contact a touch screens; and
    a bow attachment portion configured for attachment to a bow of a musical instrument.

* * * * *